United States Patent [19]
Kurtz et al.

[11] 3,873,956
[45] Mar. 25, 1975

[54] INTEGRATED TRANSDUCER ASSEMBLIES

[75] Inventors: Anthony D. Kurtz, Englewood; Joseph R. Mallon, Wood Ridge, both of N.J.

[73] Assignee: Kulite Semiconductor Products, Inc., Ridgefield, N.J.

[22] Filed: Sept. 4, 1973

[21] Appl. No.: 393,804

[52] U.S. Cl.................. 338/2, 29/590, 73/88.5 SD, 338/4, 338/5
[51] Int. Cl. ............................................ G01l 1/22
[58] Field of Search .......... 338/2, 4, 5; 73/88.5 SD; 29/590; 357/68, 80

[56] References Cited
UNITED STATES PATENTS
| | | | |
|---|---|---|---|
| 3,513,430 | 5/1970 | Heller | 338/2 |
| 3,654,579 | 4/1972 | Kurtz | 338/2 |
| 3,800,264 | 3/1974 | Kurtz | 338/2 |

Primary Examiner—C. L. Albritton
Attorney, Agent, or Firm—Arthur L. Plevy

[57] ABSTRACT

A transducer assembly comprises a thin diaphragm of silicon having at least one piezoresistive element located in a central active area of the diaphragm. The diphragm has a metal ring containing terminal accommodating apertures about the periphery thereof. The metal ring bounds the outermost portion of the diaphragm designated as a non-active area. An annular housing fabricated from a high dielectric material has a series of wire accommodating grooves in a side wall thereof each one aligned with a predetermined one of said terminal accommodating apertures. The metal ring is secured to the annular housing with the active area of the diaphragm surrounded by a central aperture of the annular housing. The metal ring is secured to the housing by an electrostatic glass bond.

6 Claims, 12 Drawing Figures

INTEGRATED TRANSDUCER ASSEMBLIES

BACKGROUND OF INVENTION

This invention relates to electromechanical transducers and more particularly to such transducer assemblies employing piezoresistive semiconductor strain gages on thin diaphragms which are secured to a housing by electrostatic glass bonds.

The invention further relates to techniques for fabricating an improved transducer assembly employing glass bonds.

There is a class of pressure transducers which utilize the piezoresistive effect to enable high outputs. These units are semiconductors and have resulted in the construction of electromechanical force transducers with superior output characteristics and operating frequencies as compared to those of the prior art.

The piezoresistive transducer technology is compatible in many respects with integrated circuit techniques.

Generally, a transducer comprises a relatively thin diaphragm which may be constructed of silicon. A strain gage bridge assembly is then diffused or grown onto the silicon diaphragm as are suitable contact arrangements. The diaphragm plus the gages and contacts are then mounted to a suitable housing in order to properly protect and utilize the transducer assembly.

It is desirable to secure the diaphragm to the housing so that a hermetic seal is obtained. This assures protection of the gages and enables accurate and reliable measurements while providing better high temperature operation.

The prior art shows various schemes for formulating a bond between the diaphragm and the housing. Thus, epoxy bonds are used. These bonds suffered as the epoxy exhibited plastic behavior at raised temperatures causing spurious forces to be applied to the gage via the diaphragm.

Glass bonds were also used and are known. One could secure the diaphragm to a housing be means of solder glass. These glasses devitrify at a temperature compatible with methods of lead attachment to silicon. Upon devitrification of these glasses, a partially crystalline structure develops which results in a seal much stronger and harder than available with a vitreous glass. The difficulty with these techniques is that the bond was not uniform and the sealing process is not compatible with certain fabrication processes employed in the fabrication of piezoresistive sensors. Another problem was that the gages were subjected to a compressive force during the cooling process.

The prior art recognized that strong hermetic seals could be acheived between glass and various metals at relatively low temperatures by applying an electrostatic bias across the glass to the metal interface during the sealing process. Such seals were achieved at temperatures between 200°F to 400°F below the melting point of the glass. In any event, this technique still presented problems when attempting to fabricate high quality transducers.

For example, U.S. Pat. No. 3,654,579 entitled ELECTROMECHANICAL TRANSDUCERS AND HOUSING, issued on Apr. 4, 1972 to A. D. Kurtz, et. al., and assigned to the same assignee herein, shows an improved transducer. The transducer employs a semiconductor wafer secured to a housing by means of a bond. In any event, the housing has wire accommodating apertures or slots. These slots enable one to direct wires or leads therethrough, which leads interface with the contacts or terminals areas on the silicon diaphragm. As is explained in the patent, by routing the leads through the apertures, one obtains improved operation and better characteristics in regard to the transducing assembly. Hence, it is extremely desirable to maintain a "slotted" housing in the production of a high performance transducer.

It is also important that the edges of the diaphragm be well bonded or sealed to the housing since a simply supported diaphragm has a significantly lower sensitivity than a clamped diaphragm. In addition, as above indicated, the seal or bond must exhibit good mechanical properties as well as being leak-free over the full temperature range of the transducer.

Due to the fabrication process, a "step" is formed in the clamping region of the diaphragm which would otherwise prevent the formation of a proper seal. Therefore, due to these considerations as well as terminal placement on the diaphragm, one experiences difficulties with the electrostatic bonding technique, even though the technique can afford a good seal.

It is therefore an object of the present invention to provide an improved transducer assembly employing a slotted housing with a silicon transducer secured to the housing by means of a glass bond formed by an electrostatic process.

DESCRIPTION OF PREFERRED EMBODIMENT

A transducer assembly comprises a thin diaphragm fabricated from a semiconductor material and having located on a surface thereof at least one force responsive element, said element positioned within a central portion of said diaphragm, a metal ring having a central aperture defining said active area and a plurality of terminal accommodating apertures about the periphery of said ring, means securing said ring to said diaphragm with the active area within said central aperture of said ring and an high dielectric annular housing having a series of wire accommodating grooves in a sidewall thereof secured to said ring with the apertures in said ring aligned with the grooves in said housing.

Techniques for bonding the ring to the housing to provide a hermetic seal also described.

DETAILED DESCRIPTION OF FIGURES

Figure 1:
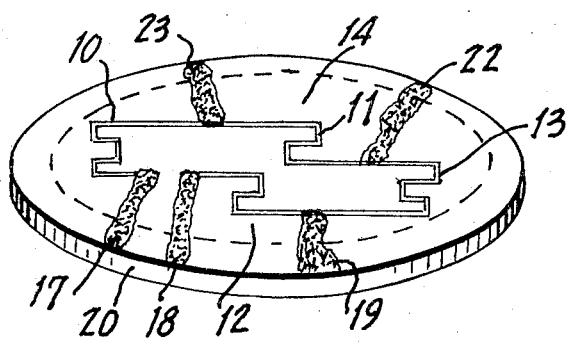
FIG. 1 is a view in perspective illustrating a typical transducer assembly employing a relatively thin diaphragm, a bridge assembly and contacts.

Referring to FIG. 1 there is shown a silicon diaphragm 20 containing a four-arm wheatstone bridge assembly. The diaphragm 20 comprises a thin disk of silicon onto which piezoresistive bridge elements 10, 11, 12 and 13 have been atomically bonded or otherwise deposited using conventional semiconductor techniques as solid state diffusion or epitaxial growth techniques.

The strain gage configuration is determined by an oxide masking or photo-lithographic technique. Each of the stress sensors or gages 10, 11, 12 and 13 may be isolated from the silicon diaphragm 20 by the formation of a P-N junction and are arranged on the surface so that two of the elements are in tension and two are in compression for the application of a force.

Shown within a dashed line enclosing the piezoresistive elements 10 through 13 is an area 14. This area is designated as the active area and is that area which is primarily effected by the application of a force to the diaphragm 20.

The piezoresistive elements 10 through 13 are arranged on the surface of the silicon diaphragm and within the active area 14 to take primary advantage of the forces applied thereto in relation to the semiconductor crystallographic axis. Briefly, it is known that in the design of such transducers, cognizance must be taken of both the longitudinal and transverse piezoresistive coefficients if optimum characteristics are to result.

The peripheral area shown on the diaphragm is that area which is defined as the non-active area and is that area used to bond the diaphragm 20 to a housing.

In this manner, the contacts 17, 18, 19, 22 and 23, which are, diffused nunnus with metal terminals, are directed and located on the non-active area. It is to these contacts that leads will be soldered or attached to and directed to a suitable terminal assembly or connector associated with a housing. If reference is made to the above noted patent, examples of such housings with wire or conductor accommodating channels will be shown.

Figure 2A:
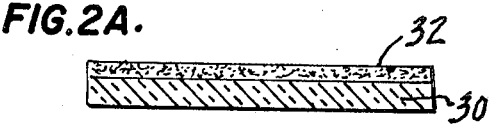
FIGS. 2A to 2H are a series of views showing the structures obtained by a series of steps of a process which is used to fabricate a transducer assembly according to this invention.

Referring to FIG. 2A, there is shown a silicon wafer 30 fabricated from a monocrystalline N-type silicon. A layer of silicon dioxide 32 is grown on a surface of the silicon wafer 30 and to a depth of about 2,000 Angstroms. The layer of silicon dioxide 32 can be grown under elevated temperature in the presence of water vapor by a thermal oxidation process.

The contact pattern and runners are then impressed on the wafer utilizing silicon dioxide masking and photolithographic techniques and depositing impurities to form ohmic contacts.

Figure 2B:
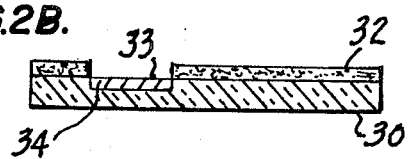
Figure 2C:
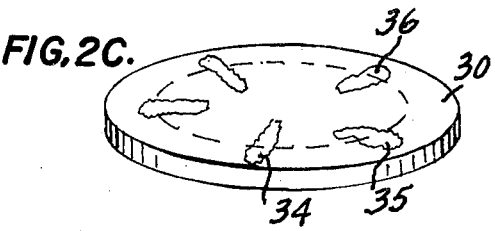

The contact areas as 17 and 19 and runners are formed (FIG. 2B) by the masking process and diffused into the etched-out area. FIG. 2B shows a cross section through a contact terminal. As is seen, there is a step 33 provided which is equal to the height of the original oxide layer 32 or about 2,000 Angstrom units. FIG. 2C shows a top view of the diaphragm with an etched-out and diffused contact and runner area 34.

As indicated, the terminal area is located in the non-active area of the wafer which is the area to which the diaphragm 30 is to be secured. The step 33 will prevent a good hermetic seal from ocurring because of the discontinuity. The openings as 34, 35, 36 and so on correspond to each terminal and runner or each contact as 17, 18, 19, 22 and 23 on the wafer shown in FIG. 1.

Figure 2D:
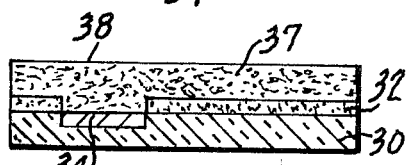

Referring to FIG. 2D, a thick layer of silicon dioxide 37 is grown on top of the step and the layer 32. The time dependence of the growth of the layer of silicon dioxide is typified by a parabolic rate. This parabolic rate is typical of the reaction which is limited by the avilability of "molecular water" at the interface of the silicon. In any event, the silicon dioxide grows "faster" over the diffused contact areas than over the silicon dioxide layer 32. Therefore, a layer of approximately 16,000 Angstroms will almost completely eliminate the step and only a slight depression 38 remains. This depression does not prevent the formation of a good hermetric seal.

After the thick oxide layer 37 is grown (FIG. 2D), the silicon dioxide layer 37 is masked and etched and the piezoresistive bridge elements are diffused at the center of the diaphragm within the active area 14. This diffusion is shown in cross section view in FIG. 2E and a top view in FIG. 2F. It is generally advantageous to perform the diffusion at this stage after the growth of the thick step-leveling and insulating oxide over the contact runners. This is so since oxidation subsequent to the resistor diffusion results in a loss of control and the reduction of the net average impurity concentration in the piezoresistive elements. It is often desirable to have maximum impurity concentration and diffusion and performing the sequence of operations in the sequence or steps indicated allows this. The resistor pattern is caused to overlay the contact pattern to assume the structure of FIG. 1.

Figure 2E:
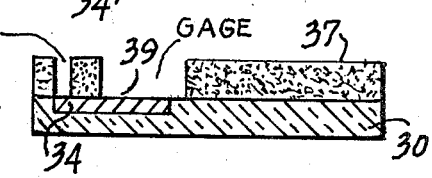
Figure 2F:
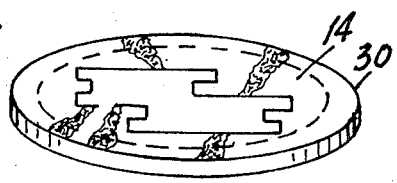

A piezoresistor 39 is shown in cross section in FIG. 2E as an example only. After the resistors have been diffused into the diaphragm 30, the terminals are formed by a metalization process. The formation of metal terminals is known. Therefore metal is deposited on the contact areas as desired.

As indicated previously, the runners are diffused and form ohmic contact, the terminal areas are metalized so that a solder connection can be made to route leads and so on to a final connector assembly.

Figure 2G:
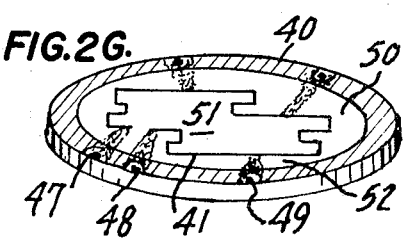

Referring to FIG. 2G, there is shown a top view of the metalized structure. The metal ring 40 is deposited aluminum and has a series of U-shaped apertures as 41 which surround or enclose a terminal area on the wafer. Each contact area is also metalized at the terminal portion of the contact near the periphery and within the non-active area. The ring 40 as shown as well as the metalized terminal areas as 47, 48 and 49 correspond with 17, 18 and 19 of FIG. 1. The metal may be aluminum and because of the metalization techniques, the areas formed are relatively flat and smooth.

Referring to FIG. 2G, the structure depicted is as follows. The diaphragm 50 has diffused therein a bridge arrangement 51. The resistors of the bridge are accessed by diffused runners (dashed) as 52. The runners are directed to the periphery where they are coupled to a metal rod 49 which appears as a "dot." This is a terminal area 49 enabling one to solder and so on. A metal ring 40 is also deposited and is insulated by the thick layer of silicon dioxide which is on the surface 50. The metal ring 40 as formed is smooth and flat and is used to mount the transducer to a housing as will be explained in conjunction with FIGS. 3 and 4.

Figure 2H:
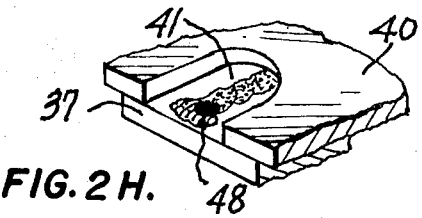

Referring to FIG. 2H, there is shown an enlarged view of the ring aperture 41 of FIG. 2G. As is seen, the metal ring 40 has the aperture 41. The metal ring 40 is, of course, deposited on the thick layer of silicon dioxide 37 and hence it is insulated from both the diaphragm 30 and the ohmic runner or contact 50. The terminal area 48 is metalized during the same process as employed in formation of the metal ring 40 and appears as a "dot" or circle of metal 48. This enables one to solder or bond a wire or conductor to the terminal area 48 and hence gain access to all the important nodes of the bridge assembly as shown in FIG. 1.

Figure 3A:
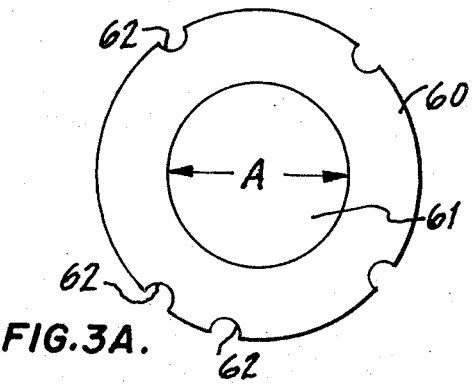
FIGS. 3A and 3B are respectively a top and a front view of a longitudinal tubular housing or an annular housing assembly according to this invention.

Referring to FIG. 3A there is shown a top view of glass annular housing 60. The housing 60 may be fabricated from glass, quartz or other high dielectric material suitable for electrostatic bonding. An ideal glass for this purpose is Corning Glass No. 7740. The housing may have a central aperture 61 which is approximately congruent with the active area of the wafer. This is, of course, necessary to permit the wafer to readily deflect when secured to the housing. The housing also contains a series of wire accommodating grooves or apertures 62. The apertures are aligned to coact with the apertures in the metal ring 40 of FIG. 2G. Thus, when the ring 40 is placed on the top surface of the housing 60 and correctly oriented, each terminal as 47, 48 and 49 coacts with a groove 62.

Figure 3B:
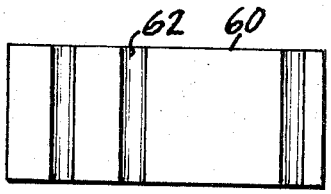

Hence, a wire can be secured to the terminal and directed within the groove. FIG. 3B shows a side view of the housing and clearly depicts the grooves or slots 62.

Figure 4:
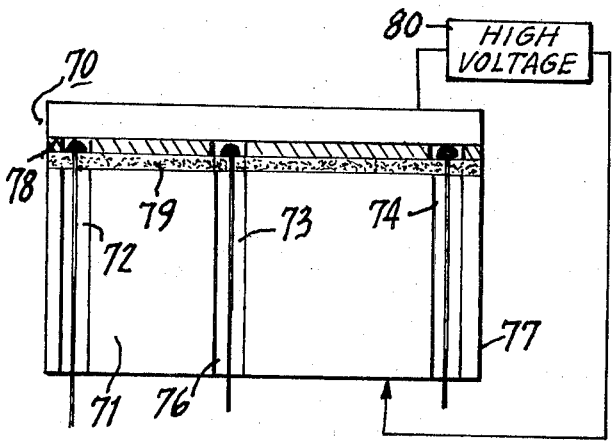
FIG. 4 is a side view of a transducer assembly depicting a transducer bonded to a housing by means of a glass electrostatic bond.

Referring to FIG. 4 a processed transducer 70 (FIG 2G) is placed on the top surface of a housing 60. The active area of the diaphragm is enclosed within the opening of the housing 60 to permit easy deflection of the diaphragm upon application of a force to the diaphragm. The wafer is aligned with the housing such that the terminal areas 72, 73, and 74 are located above the appropriate slots 75, 76, and 77 in the housing. The transducer 70 is placed with its metal ring 78 in contact with a glass housing 60. The non-active area as defined by the ring is to be bonded to the top of the housing 60 by using electrostatic bonding techniques.

In any event, the electrostatic bonding techniques can provide a seal between the metal ring 70 and the glass housing 60. An electrostatic bias is applied between the wafer 70 and the housing 60. The bias is obtained from a high voltage source 80 capable of providing a voltage in excess of 200 or more volts. The units brought in contact under a temperature of between 200°F to 400°F below the melting point of glass and the bias is provided. A strong mechanical bond is provided between the metal ring 78 and the housing 60. The electrostatic bond 79 is extremely thin and the bond formed is extremely strong.

The bond can be conveniently employed because one is bonding a metal ring 78 to the glass housing 60. The ring is smooth and flat and has no "step" transition, plus the conductivity is much lower than $SiO_2$ and hence a better bond is more easily afforded. The bond is referred to in the prior art as an electrostatic bond or an anodic bond. Measurements show that such bonds may be on the order of 20 to 200 Angstroms thick. The heat is used to decrease the conductivity of the wafer and silicon dioxide layers to cause current to flow through the same and the glass thus creating the bond.

This composite of the silicon disc with integral piezoresistive elements and the glass housing comprise essentially a complete transducer structure. In some cases, however, it may be advantageous to affix this structure to a metal housing. Such a metal housing may or may not have lead wire accommodating apertures, and the bond between the structure described and this housing may be an electrostatic bond, solder glass bond, epoxy bond, etc., depending on the nature of the design requirements. It is, of course, not necessary that a glass housing 60 be fabricated as an individual piece. It may, in fact, be a layer formed upon a metal housing by conventional techniques. The important point is that a desirable bond is formed between silicon and glass members via electrostatic bond. this technique affords improvement in performance as previously noted.

The use of a glass housing a metal ring to facilitate the bond is the preferred embodiment of the invention. However, the technique of two-step oxidation can be employed to bond a silicon diaphragm directly to a metal housing via an intermediate $SiO_2$ layer while eliminating the undesirable step typically formed with one-step oxidation.

While the foregoing description and specification sets forth the principles of the invention in connection with specific apparatus, it is to be understood that the description is made only by way of example and not as a limitation of the scope of the invention as set forth in the accompanying claims.

We claim:

1. A transducer assembly comprising:
    a. a realtively thin diaphragm fabricated from a semiconductor material and having located on a surface at least one force responsive element in an active central area of said diaphragm, said central area surrounded by a peripheral non-active area,
    b. a tubular base member having a central aperture relatively congruent with said active area of said diaphragm and having on a surface thereof a plurality of wire accommodating apertures, said base member fabricated from a high dielectric material,
    c. a thin and relatively smooth metal ring, deposited about the periphery of said diaphragm, said ring having a plurality of apertures about the periphery thereof, said ring having a central aperture approximately congruent with said active area, and
    d. means including a glass bond of a thickness substantially less than the thickness of said thin diaphragm, coupling said ring between said diaphragm and said tubular base member with said apertures about the periphery of said ring communicating with said wire accommodating apertures of said base member.

2. The transducers assembly according to claim 1 wherein said means coupling said ring between said diaphragm and said housing includes at least one bond fabricated from a glass, having a melting temperature below 400°F.

3. The transducer according to claim 1 wherein said force responsive element is a piezoresistor.

4. A transducer assembly comprising:
    a. a relatively thin diaphragm fabricated from a semiconductor material and having located thereon at least one force responsive element in an active central area of said diaphragm, and said central area surrounded by a peripheral non-active area,
    b. a longitudinal tubular member having a central aperture relatively congruent with said active area of said diaphragm and having on a surface thereof a plurality of wire accommodating slots, said member fabricated from a dielectric insulating material,
    c. a thin and relatively smooth metal ring deposited about the periphery of said thin diaphragm, said ring having a plurality of U-shaped apertures about the periphery thereof defining contact areas, said ring having a central aperture approximately congruent with said active area, whereby U-shaped apertures are located within said non-active area, and d. insulating means including a glass bond of a thickness substantially less than the thickness of said thin diaphragm coupling said ring between said diaphragm and said tubular member with each one of said apertures in direct communication with a respective one of said slots, whereby said apertures and said slots form locating positions for connecting utilization means to said force responsive element.

5. A transducer assembly comprising a thin diaphragm fabricated from a semiconductor material and having located on a surface thereof at least one force responsive element, said element positioned within a central portion of said diaphragm, a thin and relatively smooth metal ring, deposited about the periphery of said diaphragm, having a central aperture defining said active area, and a plurality of terminal accommodating apertures about the periphery of said ring, means securing said ring to said diaphragm with the active area within said central aperture of said ring and an annular housing having a series of wire accommodating grooves in a sidewall thereof secured to said ring with the apertures in said ring aligned with the grooves in said housing.

6. The transducer according to claim 5 wherein said metal ring is secured to said housing by means of an electrostatic glass bond.

* * * * *